United States Patent [19]

Barecki et al.

[11] 4,266,822

[45] May 12, 1981

[54] FOLDABLE TRANSPORTATION SEAT

[75] Inventors: Chester J. Barecki, Grand Rapids; Larry A. Wilkerson, Wyoming, both of Mich.

[73] Assignee: American Seating Company, Grand Rapids, Mich.

[21] Appl. No.: 960,913

[22] Filed: Nov. 15, 1978

[51] Int. Cl.³ ............................................. B60N 1/12
[52] U.S. Cl. ................................ 296/65 R; 105/345; 244/118.6; 410/20; 410/51
[58] Field of Search ........... 280/179 R; 296/69, 65 R, 296/63, 19; 297/217, 250, 331, 334, 335, 336, 340, 341; 105/345, 344; 244/118 P; 410/3, 4, 7, 19, 20, 51

[56] References Cited

U.S. PATENT DOCUMENTS

| | | | |
|---|---|---|---|
| 1,835,840 | 12/1931 | Barclay | 296/65 R |
| 4,093,303 | 6/1978 | Nelson | 280/179 X |
| 4,103,934 | 8/1978 | Arnholt et al. | 297/335 X |
| 4,113,270 | 9/1978 | Barecki | 280/179 R |

Primary Examiner—John J. Love
Assistant Examiner—Milton L. Smith
Attorney, Agent, or Firm—Price, Heneveld, Huizenga & Cooper

[57] ABSTRACT

A foldable transportation seat includes a seat support, a seat having a bench portion, a pivot pin pivotally mounting the bench portion to the seat support, a bumper support member extending generally outwardly from the seat support adjacent a side of the seat bench and a bumper carried by the bumper support member. The bumper is non-rotatably secured to an elongated rod which is rotatably mounted on the bumper support member. A lever secured to the pivot pin and rotatable therewith is connected to the elongated rod by a cable which is wrapped around the rod. Pivotable movement of the seat bench rotates the bumper from a stored position to an operative position. A seat back is pivotally supported to the seat support and linked to the bench so as to assume an angled position from vertical when the seat bench is in a horizontal position.

21 Claims, 13 Drawing Figures

FOLDABLE TRANSPORTATION SEAT

BACKGROUND OF THE INVENTION

The present invention relates to transportation seating and more particularly to seating adapted to facilitate the transport of wheelchair passengers.

Conventional transportation seating of the type employed in passenger vehicles, such as buses, trains, airplanes and the like, is not readily adapted to the transportation of both nonhandicapped passengers and handicapped passengers who are confined to wheelchairs. The general seating configuration in most such vehicles restricts the ease with which a handicapped and wheelchair bound individual may be moved between the seats and transferred to such conventional, nonfoldable seating. Typically, a great deal of effort is required to transfer such a handicapped passenger from the wheelchair exteriorly of the vehicle to the conventional seat.

In an attempt to alleviate problems heretofore experienced with the transportation of wheelchair bound passengers, foldable seats have been developed which include provision for restraining a wheelchair. One form of such a seat is referred to as a "jump" seat and includes a fixably positioned back portion and a foldable bench portion. A wheelchair retainer or locking mechanism may be secured to the undersurface of the bench portion. When the bench is folded to its stored position, a wheelchair may be backed up and into engagement with the wheelchair retaining means. The wheelchair retainer will lock the wheelchair in position and a conventional active passenger restraint system such as seatbelt devices may be employed to restrain the wheelchair and the passenger positioned therein.

An example of one form of wheelchair retainer mechanism and jump seat may be found in commonly owned U.S. Pat. No. 4,113,270, entitled WHEELCHAIR RETAINER MECHANISM and issued on Sept. 12, 1978, in the name of Chester J. Barecki. The wheelchair retainer mechanism disclosed in this patent is adapted for securement to the undersurface of the bench portion of a foldable jump seat or for securement to other portions of the vehicle interior. The jump seat type construction illustrated in the aforementioned patent is not readily adaptable to all vehicle floor plans. Typically, such a seat is mounted transversely of the vehicle and additional space is required to accommodate a wheelchair. When the seat is folded and the wheelchair is positioned in place, they occupy a greater area than the conventional transverse seat. Such jump seats have a relatively straight back and, due to their folding nature, are not as comfortable as conventional transverse seating when being employed by nonhandicapped passengers in a normal fashion. Further, such a jump seat when employed with a single wheelchair retainer mechanism may not position the wheelchair completely perpendicular to the seat structure.

SUMMARY OF THE INVENTION

A need exists for a foldable transportation seat which will comfortably transport passengers in a normal fashion yet will easily accommodate a wheelchair in the space normally occupied by the bench portion of the seat. A need also exists for such a transportation seat which is readily adapted to existing vehicle structures with limited or no modification. Essentially, the unique transportation seat in accordance with the present invention includes a bench, a seat support and mounting means pivotally supporting the bench in a vehicle for movement between a first, generally horizontal position for normal passenger transportation and a second, generally vertical position. A wheelchair retainer mounting means is carried by the bench for mounting a wheelchair retainer thereto. Pivotable movement of the bench portion from the first to the second positions will position the wheelchair retainer mounting means so that a wheelchair retainer is positioned to lockingly retain a wheel of a wheelchair. Provision is made for positioning and stabilizing the remaining wheel of a wheelchair when the chair is locked by the wheelchair retainer.

In narrower aspects of the invention, a bumper means stabilizes the wheelchair and includes a bumper or stop which is automatically shifted from a stored position to an operative position upon rotation of the bench portion of the seat from a first, normal position to a second, stored position. Further, the seat includes a back portion which is pivoted to the seat support and mounting means so as to assume a normally angled position relative to vertical when the bench is in the lower or first position. The back portion shifts to a near vertical orientation upon folding of the bench portion so as to reduce the overall transverse dimension of the folded seat from that heretofore obtained.

DETAILED DESCRIPTION OF THE PREFERRED EMBODIMENT

Figure 1:
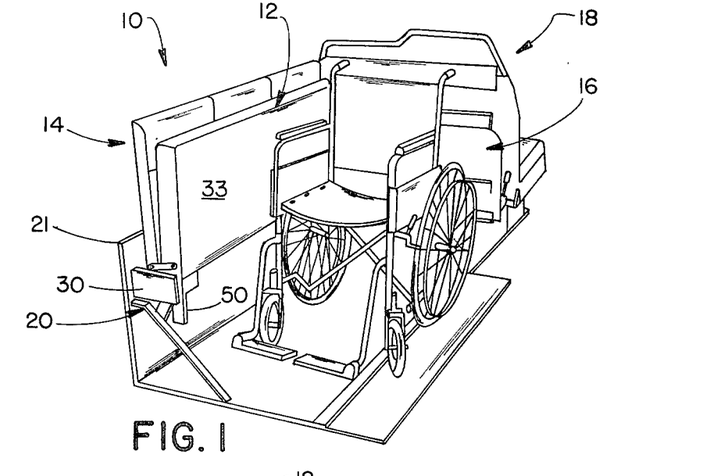
FIG. 1 is a perspective view of the unique foldable transportation seat in accordance with the present invention with a wheelchair in position.

A preferred embodiment of the unique transportation seat in accordance with the present invention is illustrated in FIG. 1 and generally designated 10. As shown therein, the transportation seat 10 includes a bench portion 12, a back portion 14 and a bumper assembly 16.

Figures 4, 5, 6, 7:
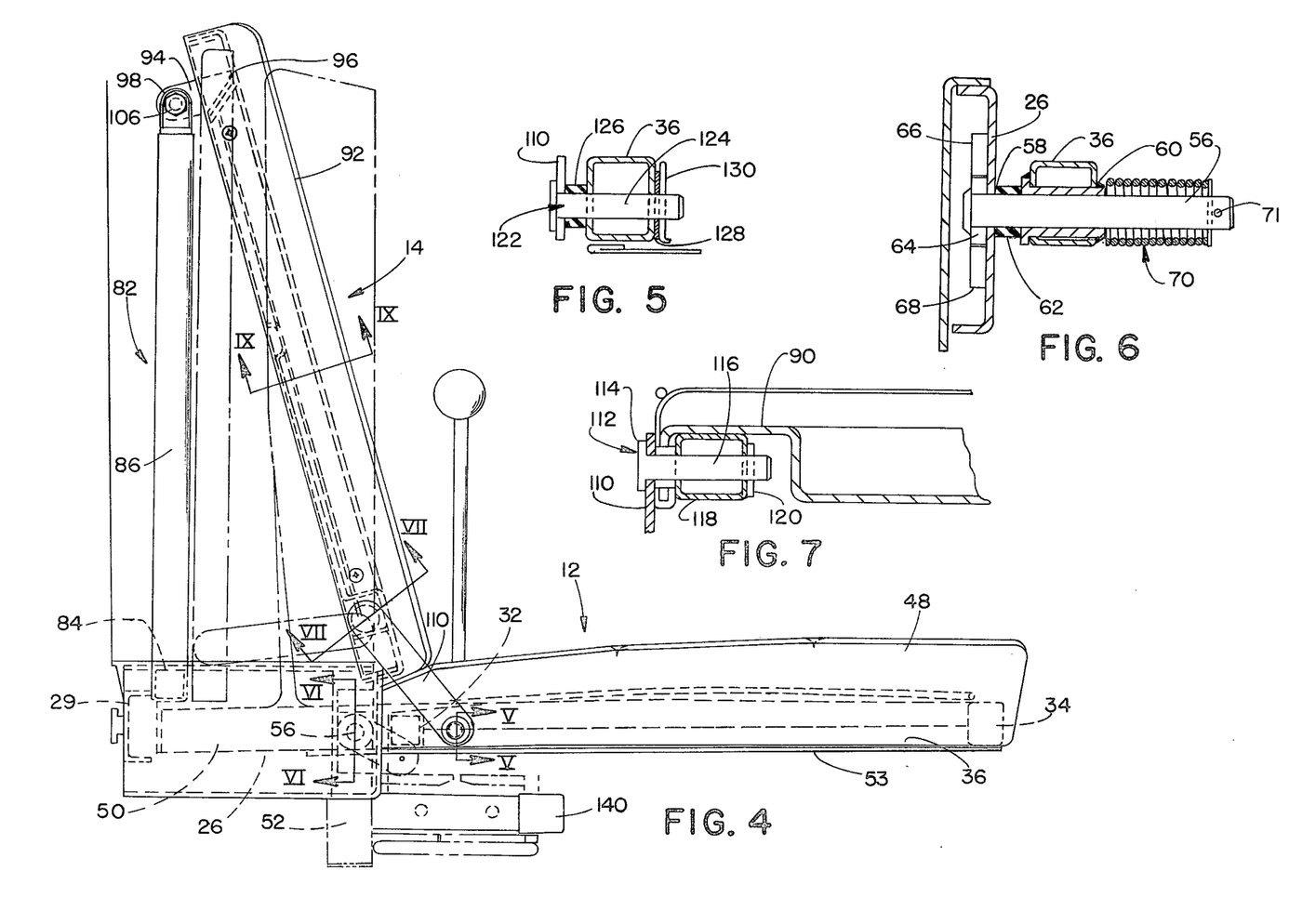
FIG. 4 is a side, elevational view of the seat in accordance with the present invention.
FIG. 5 is a cross-sectional view taken generally along line V—V of FIG. 4.
FIG. 6 is a cross-sectional view taken generally along line VI—VI of FIG. 4.
FIG. 7 is a cross-sectional view taken generally along line VII—VII of FIG. 4.
Figures 8, 9, 10:
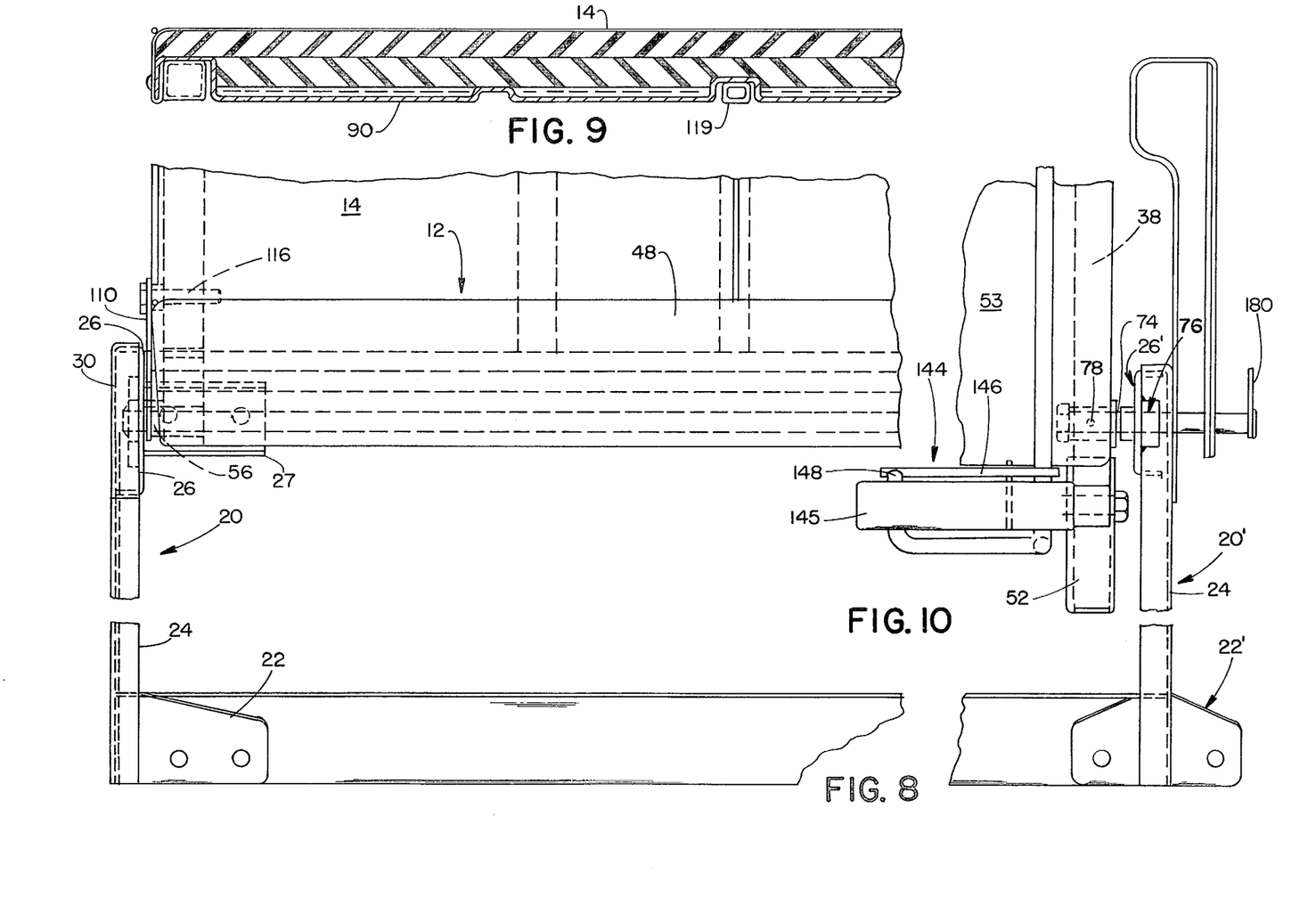
FIG. 8 is an enlarged, fragmentary, front elevational view of the transportation seat with the bench portion in the horizontal position.
FIG. 9 is a cross-sectional view taken generally along line IX—IX of FIG. 4.
FIG. 10 is a fragmentary, front elevational view of the transportation seat with the bench portion in the vertical position.
Figures 12, 13:
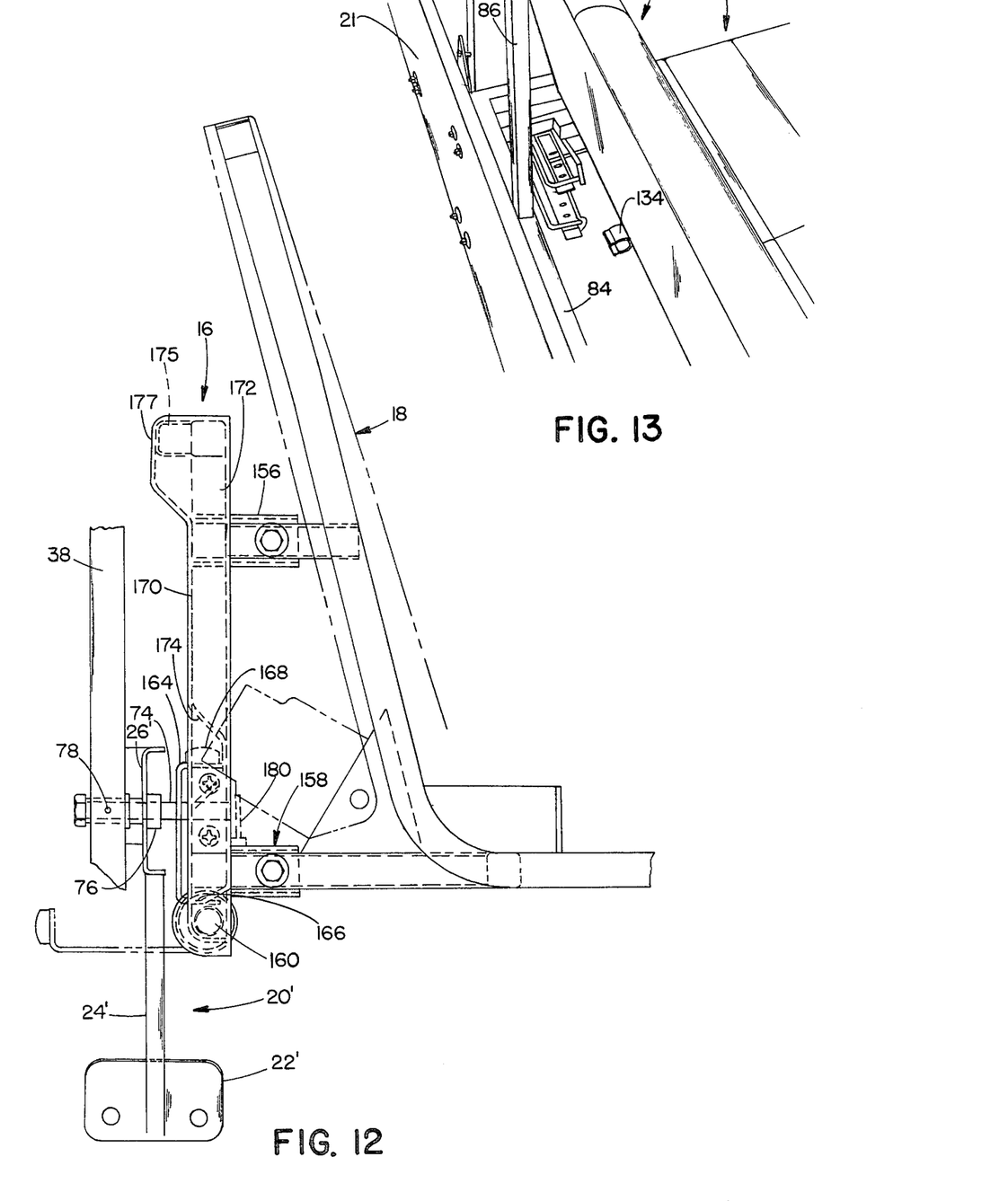
FIG. 12 is a side, elevational view of the bumper and arm assembly of FIG. 10.
FIG. 13 is a rear, fragmentary, perspective view of the foldable transportation seat in accordance with the present invention.

In the embodiment illustrated, the seat 10 is adapted for longitudinal positioning with respect to a vehicle adjacent a conventional transverse seat 18. The seat 10 is supported by seat supports 20 and 20' (FIGS. 8 and 12). In the embodiment illustrated, the seat supports 20 and 20' support the seat from wall structure 21 of the vehicle. As seen in FIG. 8, support 20 includes a lower wall bracket 22 adapted to be bolted or otherwise suitably secured to the interior of the vehicle, an upwardly extending channel-shaped strut 24 and an upper wall bracket 27. Secured to strut 24 adjacent its upper end is a generally channel-shaped plate 26. Wall mount support 20' is of similar construction and, as seen in FIG. 12, includes a lower wall bracket 22', a strut 24' and a support plate 26'. An upper wall bracket, not shown, is also included. The supports 20, 20' are also preferably interconnected by an elongated, channel member 29 (FIG. 4). Plastic trim pieces 30 may be included to cover the support structure (FIG. 1). The interconnected supports 20, 20' in effect define a single seat support or seat support and mounting means.

As seen in FIGS. 4 and 8, the bench portion 12 of the seat 10 includes a rear stretcher 32 and a front stretcher 34. The front and rear stretchers are interconnected by side stretchers 36, 38. Also, it is preferred that intermediate stretchers (not shown) interconnect the front and rear stretchers. The seat has suitable cushioning material 48 secured on the top of the stretchers 32, 34, 36 and 38. Side stretcher 36 extends rearwardly or past the rear stretcher 32 and includes an extension portion 50. Side stretcher 38 also extends beyond the rear stretcher 32 and includes an extension 52. The extensions 50, 52 may be separate tubular pieces secured to the side stretchers. As more fully described below, extension 52 is a wheelchair lock or retainer mechanism mounting means. The undersurface of bench 12 may be covered with a plastic trim panel 53.

As seen in FIGS. 4, 6 and 8, the seat bench portion 12 is pivotally secured to the left-hand wall mount 20 by a pivot pin 56. As best seen in FIG. 6, pivot pin 56 extends through an aperture 58 formed in channel member 26. The pin 56 also extends through a bushing 60 carried by side channel 36. The bushing 60 is weldably or otherwise suitably secured to the side channel at suitable apertures formed therein. Positioned between the bushing 60 and channel member 26 is a suitable nylon washer or bushing 62. A plate 64 is secured to the pin 56 and rotation of the pin is prevented by upper and lower plates 66, 68 which abut plate 64 and prevent rotation thereof. A biasing means 70 illustrated in the form of a coil spring is positioned around pivot pin 56. Coil spring 70 biases side stretcher 36 and hence the bench portion 12 of the seat to a first, generally horizontal position as illustrated in FIGS. 4 and 8. Spring 70 engages channel 36 at one end and a pin 71 at the other end. Pin 71 extends through pivot pin 56.

Figure 3:
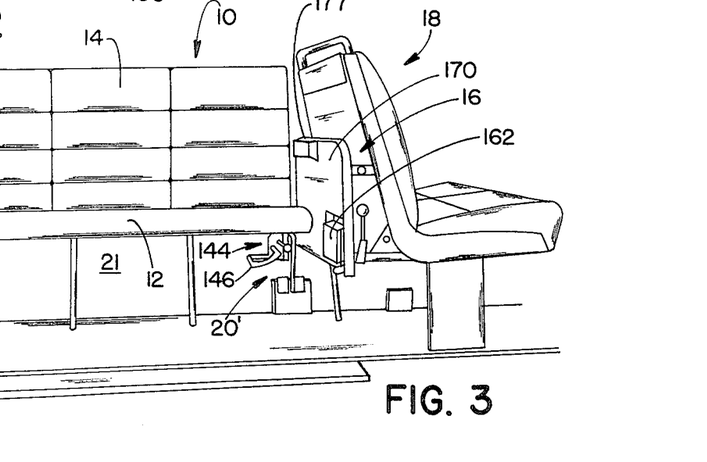
FIG. 3 is a front, perspective view of the foldable seat in accordance with the present invention with the bench portion thereof in a normal horizontal position.

The seat 12 is also pivotally secured to plate 26' of the right-hand wall mount bracket 20'. As best seen in FIGS. 10 and 12, a pivot pin 74 extends through plate 26' and stretcher 38 of bench portion 12. Plate 26' of the right-hand bracket 20' supports a suitable bushing 76 through which the pin extends. Also, the pin 74 is fixedly secured to the side stretcher 38 so as to rotate within the bushing 76 upon pivotal movement of the bench portion of the seat from a first, generally horizontal position, as shown in FIG. 3, to a second, vertical stored position, as shown in FIG. 1. Pivot pin 74 is secured to the side stretcher 38 by a suitable lock pin 78 which extends through the side stretcher 38 and into the pin 74.

As best seen in FIGS. 4 and 13, a back pivot support including a pair of parallel, longitudinally spaced uprights 86 is provided. The seat back portion 14, as seen in FIGS. 4 and 7, includes a suitable seat back pan or structural member 90. Secured to the front of the panel 90 is suitable cushioning material and upholstery 92. Adjacent the upper lateral edge of the seat back 14 at the spaced uprights 86 are seat back pivot brackets 94. Each pivot bracket 94 has one end 96 secured to the back panel 90 and the opposite end 98 pivotally secured to the upright 86 by a suitable fastener 100. The seat back 14 also includes side stretchers 118 and intermediate stretchers 119 carried by the back pan 90 in suitable recesses.

As seen in FIGS. 4 and 8, the seat back 14 is linked to the seat bench 12 at each end thereof adjacent its lower lateral edge by suitable links 110. Since the link structure and connection to the bench portion 12 is the same on each side of the seat, only the link structure for the left-hand side of the seat, when viewed from the front thereof, will be described in detail. As seen in FIG. 7, link 110 is secured to the seat back pan 90 and stretcher 118 by a suitable pivot pin 112. The pin 112 includes a headed portion 114 and a shank portion 116. Shank portion 116 extends through link 110 and a stretcher 118 and is secured at one end by a suitable cotter pin 120. The opposite end of the link 110 is secured to the side stretcher 36 of the seat bench portion by another pivot pin 122 (FIG. 5). Pivot pin 122 includes a shank portion 124 extending through a nylon bushing 126, suitable apertures in side stretcher 36 and a washer 128. Pin 122 is held in place by a cotter pin 130.

As should be apparent from a comparison of FIGS. 1 and 3, and as shown in FIG. 4 in phantom, the bench portion 12 of the seat may be pivoted from a first, horizontal position to a second, raised position. Upon pivotal movement of the bench portion, the seat back portion 14 will move from a normal position angled with respect to vertical to a generally vertical position parallel to uprights 86. The structural interconnection between the seat back 14, the bench 12 and the seat support structure, which in the embodiment illustrated includes the uprights 86, permits the seat back portion to assume an angled comfortable position for transportation of passengers in a normal manner. However, upon folding movement of the seat bench to its stored position for accommodation of a wheelchair, as more fully described below, the overall transverse dimension of the seat is reduced substantially from that which would result if the seat back portion were not pivotally interconnected with the support structure and the seat bench. It is presently preferred, as seen in FIG. 13, that resilient clips 134 be provided to releasably engage an elongated, horizontal tubular piece 84 and thereby retain the seat in the upright, folded position against the bias of coil spring 70.

Extending outwardly from extension 52 of side stretcher member 38 is a tubular member 140. Secured to the tubular member 140 is a suitable wheelchair retainer and lock mechanism 144. The wheelchair retainer and lock mechanism 144 illustrated, includes a generally U-shaped housing 145 and a pair of pivotable jaws 146. The jaws are held in a locked position by pins 148. When the jaws are open, a wheelchair wheel 150 may be backed into the wheelchair retainer mechanism 142 and the jaws will close to secure, retain or lock the wheelchair in place. The wheelchair retainer mechanism illustrated is of the type described in U.S. Pat. No. 4,113,270. To the extent necessary, the disclosure of this patent is hereby incorporated by reference. Although this particular form of wheelchair retainer has been illustrated, other forms may be employed with the foldable transportation seat in accordance with the present invention.

Figure 11:
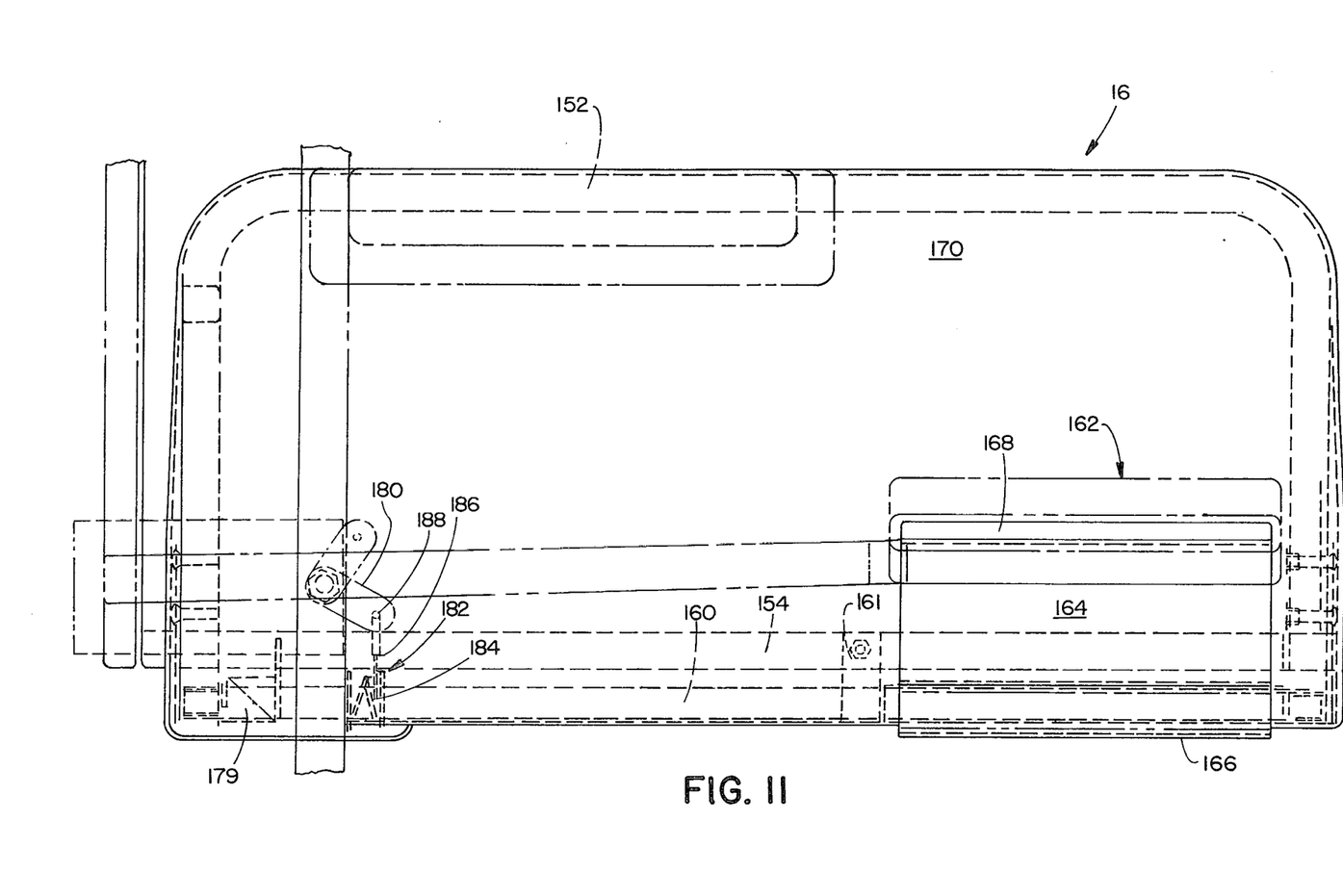
FIG. 11 is a front, elevational view of the bumper assembly incorporated in the transportation seat.

The bumper assembly 16, as best seen in FIGS. 11 and 12, includes a tubular frame structure 152 of generally U-shape. The frame 152 is connected at its lower end to an elongated, tubular bumper support 154. In the embodiment illustrated, the tubular frame 152 is supported by suitable brackets 156, 158 which are connected to the conventional transverse seat 18. In the alternative, frame 152 could be secured directly to the interior of the vehicle or could be directly attached to the seat support 20'.

An elongated rod 160 is supported by brackets 161 for rotational movement relative to member 154. Nonrotatably secured to one end of rod 160 is a bumper 162. Bumper 162 includes a generally rectangular, channel-shaped plate 164. Plate 164 has a lower lateral edge 166 nonrotatably secured to rod 160. Secured to the opposite lateral edge of plate 164 is a rubber bumper strip 168.

Suitable trim pieces 170, 172 are secured to the front and back of frame 152. Trim piece 172 defines a recess 174 within which the bumper 162 is received when the bumper is in a vertical, stored position. When in this position, the bumper is generally flush with the front panel 170. As best seen in FIGS. 3 and 12, an arm rest tube 175 is secured to frame 152 adjacent seat back 14. Trim piece 170 covers tube 175 and defines an arm rest 177 therewith.

Bumper 162 is movable from a stored position, illustrated in solid lines in FIG. 12, to a lowered, generally horizontal operative position, illustrated in phantom in FIG. 12. Provision is made for automatically pivoting the bumper 162 between the stored and operative positions upon folding movement of the bench portion 12 of the seat. As seen in FIG. 10, pivot pin 74 has a link or lever 180 secured thereto at its end opposite the stretcher 38. Lever 180 is connected to the elongated rod 160 by a cable and wheel means, generally designated 182. As best seen in FIG. 10, the cable and wheel means includes a wheel or pulley-like structure 184 which is nonrotatably secured to rod 160. A cable or flexible tension means 186 has one end 188 secured to the lever 180. The cable is wrapped around rod 160 and secured to the wheel. The cable is therefore secured to the rod 160. Since the lever 180 is nonrotatably secured to the pivot pin 74, the lever will be rotated from a first, lower position, as seen in FIG. 11, to a second, upper position. Rotation of the lever will pull the cable or flexible tension means 186 which in turn will rotate the rod 160. Rotation of the rod 160 pivots the bumper 162 from its stored, generally vertical position to its operative, generally lower or horizontal position. A coil spring or torsion means 179 (FIG. 11) biases rod 160 to the first, stored position and returns bumper 162 to the stored position when bench 12 is lowered.

Figure 2:
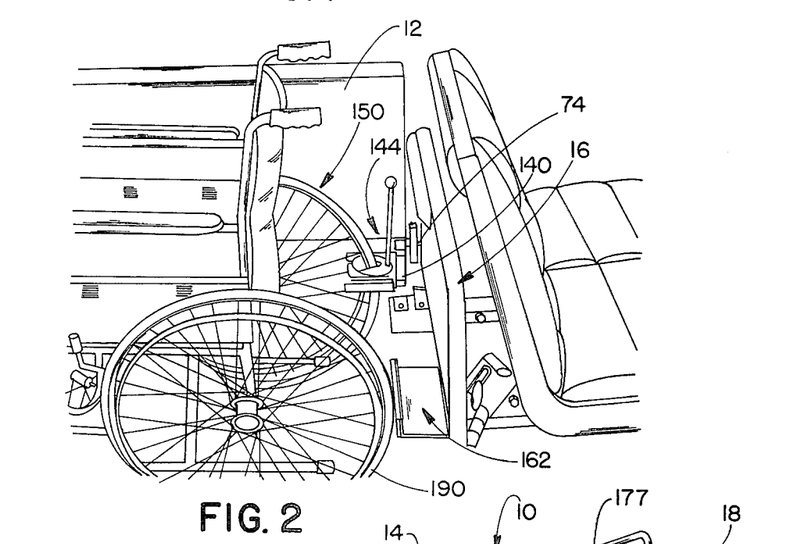
FIG. 2 is a fragmentary, front, perspective view of the foldable seat in accordance with the present invention.

As best seen in FIG. 2, when the bumper 162 is in its lowered, operative position and a wheelchair is moved into the space formerly occupied by the bench portion 12 of the seat 10, wheel 150 of the wheelchair will be locked or retained by the wheelchair retainer mechanism 142. The remaining wheel 190 of the wheelchair will engage or abut against the rubber bumper strip 168 of the bumper assembly 162. The bumper assembly 162 is dimensioned so that the transverse axis of the wheelchair will be maintained generally perpendicular to the longitudinal axis of the bench portion of the seat 12. The bumper, therefore, properly positions and stabilizes the wheelchair with respect to the foldable transportation seat and with respect to the vehicle structure itself.

In a presently existing embodiment of the unique transportation seat in accordance with the present invention, the front stretcher 36 of the bench portion 12 is fabricated from 1 by 1¼ inch, 16 gauge YST 70 steel, the rear stretcher 32 is fabricated from 1 inch square, 14 gauge YST 70 steel and the side stretchers 36, 38 are fabricated from 1 by 1¼ inch, 14 gauge YST 70 steel. The intermediate tubes or stretchers (not shown) are fabricated from ½ inch by 1 inch, 18 gauge cold rolled steel. Pivot pin 74 is fabricated from 1 inch diameter, stress proof steel. The back pan or panel 90 is fabricated from 24 gauge steel and formed to the configuration shown in a hydropress. The back side stretchers 118 are fabricated from 1 inch square, 16 gauge YST 70 steel and the back intermediate stretchers are fabricated from 1 inch square, 16 gauge YST 70 steel. The back pivot brackets 94 are fabricated from 8 gauge, stainless steel and the links 110 are fabricated from 11 gauge, stainless steel. The wall mount lower brackets 22 and 22' are fabricated from 11 gauge, stainless steel, the upper wall brackets 27 and 27' are fabricated from 11 gauge, stainless steel and the intermediate struts 24 and 24' are fabricated from ½ inch by 1 inch, 14 gauge stainless steel tubing. The side channels 26 and 26' are fabricated from 11 gauge, stainless steel. Lock mounting tube 52 and extension 50 are fabricated from 11 gauge, stainless steel tubing. Bumper assembly frame 152 is fabricated from 1 inch square, 16 gauge cold rolled steel, lower support tube 154 is fabricated from 16 gauge, cold rolled steel and the pivot tube or elongated rod 160 is fabricated from ⅞ inch O.D., 16 gauge, cold rolled steel tube. Bracket 161 is fabricated from 16 gauge, cold rolled steel. The bumper plate 164 is fabricated from 11 gauge, stainless steel. The trim covering the frame of the arm and bumper assembly, the back trim for the seat back and the trim for the bottom of the bench portion are fabricated from a plastic, sold under the brand name NOREL EN 185, and each trim piece has a thickness of approximately 0.125 inch.

OPERATION

The foldable transportation seat 10 is mounted longitudinally of the vehicle axis of so that the seat back 14 is generally parallel to the interior wall structure of the vehicle. As seen in FIG. 3, with the seat bench portion 12 in a lowered position, the bumper 162 is retracted or stored within the recess defined by the trim member of the bumper assembly. The wheelchair retainer 142 is unobtrusively stored underneath the seat. Further, the seat back 14, due to its pivotal connection by bracket 94 and link 110 to the uprights 86 and the bench 12, is angled with respect to vertical so that passengers will be comfortably seated thereon. When the area occupied by the bench portion 12 is used for a wheelchair bound passenger, the bench portion 12 will be pivoted from its first, lowered position to its second, upright position. The bench portion 12 will pivot about pivot pins 56 and 74 against the bias of spring 70. Clips 134 will hold the seat in its upright position. Simultaneously, with the pivoting of the bench portion 12, pin 74 will rotate, thereby rotating lever or link 180 in an upward or counterclockwise direction when viewed in FIG. 11. Rotation of lever 180 will pull or shift cable 186 resulting in rotation of rod 160 and movement of the bumper 162 from its stored position to its lowered, generally horizontal operative position against the bias of spring 179. The wheelchair may then be positioned and retained in the vehicle by moving wheel 150 into engagement with a wheelchair retainer mechanism 142. The remaining wheel 190 of the chair will abut the bumper 162 to properly position the chair relative to the seat, the aisle of the vehicle and the vehicle itself.

The structural interconnection between the seat back 14, the seat bench 12 and the seat support structure reduces the "envelope" or transverse width of the folded seat from that heretofore obtained by conventional jump seats. The seat, however, provides comfortable normal seating. The structure is easily and readily mounted in presently existing vehicles without modification to the existing seat mounting trackways. The seat may be cantilevered from the wall by employing the supports 20 and 20' or, in the alternative, conventional pedestals may be employed to support the seat. The foldable transportation seat permits transport of handicapped wheelchair bound passengers easily and in a manner which is readily adaptable to existing vehicle floor plans without a reduction in the number of non-handicapped passengers which may be transported. The seat provides a convenient place to mount the wheelchair retainer 142 to efficiently retain the wheelchair and accurately position same with respect to the vehicle structure. Conventional seatbelt safety devices may be secured to the seat 10 so that the wheelchair bound passenger may be strapped and restrained during vehicle movement.

The foldable transportation seat 10 is readily adaptable so that the wheelchair will face rearwardly or forwardly. In the embodiment illustrated, the bumper assembly 16 is positioned forward relative to the vehicle so that the wheelchair faces in a rearward direction. Merely by providing mirror image components, the bumper may be reversed and mounted adjacent the opposite end of the seat so that the wheelchair will face in a forward direction. This permits the foldable transportation seat to be employed on either side of the vehicle and with the passenger facing in either the forward or rearward direction. As a result, the seat is readily adaptable to a wide variety of vehicle seating layouts.

In view of the foregoing description of the preferred embodiment, those of ordinary skill in the art will undoubtedly envision various modifications which would not depart from the inventive concepts disclosed herein. For example, bumper assembly 16 may be positioned at either end of the seat bench 12. The bumper may be supported by the seat supports, by adjacent conventional seating, or bolted directly to the wall structure. Also, the seat may be configured for single or multiple passenger normal seating. Therefore, it is expressly intended that the above description should be considered as that of the preferred embodiment. The true spirit and scope of the present invention may be determined by reference to the appended claims.

The embodiments of the invention in which an exclusive property or privilege is claimed are defined as follows:

1. A foldable transportation seat for a vehicle adapted for seating a passenger in a conventional manner and for folding vertically to accommodate a wheelchair in the space formerly occupied by the seat, said seat comprising:
   a seat support adapted for securement to the interior of a vehicle;
   a seat having a bench portion;
   seat pivot means carried by said seat support for pivotally mounting said bench portion of said seat for movement between a first, generally horizontal position for normal passenger use and a second, generally vertical position;
   a bumper support member extending generally outwardly from said seat support adjacent a side of the seat bench portion;
   a bumper carried by said bumper support member; and
   bumper positioning means operatively connected to said seat and said bumper for moving said bumper from a first, stored position wherein said bumper does not interfere with normal passenger use of said seat to a second, operative position wherein a wheelchair may abut said bumper.

2. A foldable transportation seat as defined by claim 1 wherein said seat pivot means comprises a pivot pin extending through the side of said bench portion of said seat and through said seat support adjacent said bumper support member, said pivot pin being secured to said bench portion so as to rotate when said bench portion is rotated between said first and second positions.

3. A foldable transportation seat as defined by claim 2 wherein said bumper comprises a generally rectangular member pivoted to said bumper support adjacent a lateral edge of said rectangular member.

4. A foldable transportation seat as defined by claim 3 wherein said bumper positioning means comprises:
   an elongated rod, said bumper being secured to said elongated rod;
   means carried by said bumper support for rotatably mounting said elongated rod; and
   rod pivot means operatively interconnecting said pivot pin and said elongated rod for rotating said rod and positioning said bumper as said seat bench portion is pivoted between said first and second positions.

5. A foldable transportation seat as defined by claim 4 wherein said rod pivot means comprises:
   a lever nonrotatably secured to said pivot pin;
   a flexible tension member wrapped around said elongated rod and having one end secured to said rod and the other end secured to said lever whereby pivoting of said seat bench portion rotates said lever and pulls said flexible tension member to rotate said elongated rod and move said bumper from said first, stored position to said second, operative position.

6. A foldable transportation seat as defined by claim 5 further including biasing means operatively connected to said bumper for biasing said bumper to said first, stored position.

7. A foldable transportation seat as defined by claim 6 wherein said seat further includes a seat back portion having an upper lateral edge and a lower lateral edge, means for pivotally securing said seat back portion at its upper lateral edge to said seat support and a link having one end pivotally secured to said seat back portion adjacent the lower lateral edge thereof and the other end pivotally secured to said seat bench portion whereby said seat back portion is normally angled from vertical when said bench portion is in said first position and said seat back portion assumes a substantially vertical position when said seat bench portion is pivoted to said second generally vertical position.

8. A foldable transportation seat as defined by claim 7 further including a mounting tube extending from said seat bench portion adjacent said bumper support, said mounting tube extending in a substantially vertical plane when said bench portion is in said second position.

9. A foldable transportation seat as defined by claim 8 further including a wheelchair wheel lock means secured to said mounting tube for locking a wheelchair wheel to said mounting tube when said bench portion is in said second position, said bumper being dimensioned and positioned to engage another wheel of said wheelchair so that said wheelchair will be retained in a position substantially perpendicular to said bumper support member.

10. A foldable transportation seat as defined by claim 9 wherein said means for pivotally securing said seat back bench portion comprises:
   a tubular frame secured to said seat support, said frame including an elongated lower member and at least one upright member; and
   a pivot bracket having one end fixed to said seat back bench portion and the other end pivoted to said upright member.

11. A foldable transportation seat as defined by claim 10 further including:
   at least one retainer means carried by said seat back portion for engaging said elongated lower member and releasably retaining said seat back portion in said generally vertical position when said seat bench portion is pivoted to said second vertical position.

12. A transportation seat adapted for positioning generally longitudinally of a passenger carrying vehicle, said seat being usable to transport a passenger in a normally seated position and to accommodate a wheelchair, said seat comprising:
   a bench having a rear stretcher member;
   seat support and mounting means pivotally supporting and mounting said bench in a vehicle, said bench being pivotable from a first, generally horizontal position to a second, generally vertical position;
   wheelchair retainer mounting means carried by said bench on the undersurface thereof for mounting a wheelchair retainer to said bench, said wheelchair retainer mounting means placing a wheelchair retainer in a position to lockingly retain a wheel of a wheelchair when said bench is in said second, generally vertical position; and
   bumper means extending generally perpendicular to the longitudinal axis of said bench and positioned adjacent a side of said bench for engaging another wheel of a wheelchair when one wheel is positioned at the wheelchair retainer mounting means, said wheelchair retainer mounting means being positioned adjacent said bumper means, said bumper means including a support member extending generally perpendicular to the longitudinal axis of said bench, a bumper and means for securing said bumper to said support member so that said bumper extends from said support member and engages said another wheel to stabilize and position the wheelchair.

13. A foldable transportation seat as defined by claim 12 wherein said seat further includes:
   a back portion;
   back pivot means for pivotally mounting the back portion to said seat support and mounting means; and
   link means for interconnecting said bench rear stretcher member and said back portion so that said back portion assumes an angled position relative to vertical when said bench is in the first position and a generally vertical position when said bench is in the second position thereby reducing the transverse dimension of said seat back portion and bench when said bench is pivoted to its second position.

14. A transportation seat adapted for positioning generally longitudinally of a passenger carrying vehicle, said seat being usable to transport a passenger in a normally seated position and to accommodate a wheelchair, said seat comprising:
   a bench having a rear stretcher member;
   seat support and mounting means pivotally supporting and mounting said bench in a vehicle, said bench being pivotable from a first, generally horizontal position to a second, generally vertical position;
   wheelchair retainer mounting means carried by said bench for mounting a wheelchair retainer to said bench, said wheelchair retainer mounting means placing a wheelchair retainer in a position to lockingly retain a wheel of a wheelchair when said bench is in said second, generally vertical position; and
   bumper means extending generally perpendicular to the longitudinal axis of said bench and positioned adjacent a side of said bench for engaging another wheel of a wheelchair when one wheel is positioned at the wheelchair retainer mounting means, said seat further including:
   a back portion;
   back pivot means for pivotally mounting the back portion to said seat support and mounting means; and
   link means for interconnecting said bench rear stretcher member and said back portion so that said back portion assumes an angled position relative to vertical when said bench is in the first position and a generally vertical position when said bench is in the second position thereby reducing the transverse dimension of said seat back portion and bench when said bench is pivoted to its second position,
   said bumper means comprising:
   an elongated support member carried by said seat support and mounting means and extending generally perpendicular to the longitudinal axis of said bench;
   a bumper; and
   bumper mounting means carried by said elongated support for mounting said bumper for movement between a first, stored, generally vertical position to a second, operative, generally horizontal position.

15. A foldable transportation seat as defined by claim 14 wherein said bumper means further includes:
   bumper positioning means operatively interconnecting said bench and said bumper for automatically moving said bumper from said first to said second positions as said bench is pivoted from its first to its second position.

16. A foldable transportation seat as defined by claim 15 wherein said seat support and mounting means includes:
- a pivot member fixedly secured to said bench; and
- bearing means for rotatably suporting said pivot member, said pivot member rotating as said seat is pivoted between its first and second positions.

17. A foldable transportation seat as defined by claim 16 wherein said bumper mounting means comprises:
- a rod;
- a bracket secured to said elongated support for rotatably supporting said rod, said bumper being nonrotatably secured to said rod; and
- cable means interconnecting said rod and said pivot member for rotating said rod as said bench is pivoted between its first and second positions to move said bumper.

18. A foldable transportation seat as defined by claim 17 wherein said cable means comprises:
- a lever having an end secured to said pivot member and another free end; and
- a cable having an end secured to the free end of said lever and another end secured to said rod, said cable being wrapped around said rod so that movement of said lever upon movement of said bench from its first to its second positions rotates said rod and said bumper is moved from its first to its second, operative position.

19. A foldable transportation seat as defined by claim 18 wherein said back pivot means comprises:
- a frame carried by said seat support and mounting means; and
- a bracket having an end secured to said back portion and an end pivoted to said frame.

20. A foldable transportation seat as defined by claim 19 wherein said bumper means further includes:
- a panel carried by said elongated member, said panel defining a recess for said bumper, said recess being dimensioned so that said bumper is generally flush with said panel when said bumper is in its first, stored position.

21. A foldable transportation seat as defined by claim 20 wherein said seat support and mounting means comprises a pair of wall mount brackets, one of said wall mount brackets including said bearing means, the other of said wall mount brackets being adjacent the side of said bench opposite said bearing means, said seat support mounting means further including:
- another pivot member fixed to said other of said wall mount brackets and rotatably supporting said bench; and
- biasing means carried by said another pivot member for biasing said bench to said first, generally horizontal position.

* * * * *

UNITED STATES PATENT AND TRADEMARK OFFICE
CERTIFICATE OF CORRECTION

PATENT NO. : 4,266,822
DATED : May 12, 1981
INVENTOR(S) : Chester J. Barecki et al It is certified that error appears in the above—identified patent and that said Letters Patent is hereby corrected as shown below:

Column 6, line 51:

After "axis", delete --of--;

Column 8, line 21:

After "wheelchair", insert --wheel--;

Column 11, line 5:

"suporting" should be --supporting--.

Signed and Sealed this

Fourth Day of August 1981

[SEAL]

Attest:

Attesting Officer

GERALD J. MOSSINGHOFF

Commissioner of Patents and Trademarks